G. E. SPEAR.
THERMOSTATIC CIRCUIT CONTROLLER.
APPLICATION FILED APR. 11, 1913.

1,112,391.

Patented Sept. 29, 1914.

Witnesses:
M. G. Crozier
J. Murphy

Inventor:
George E. Spear
by Jas. H. Churchill
Atty.

UNITED STATES PATENT OFFICE.

GEORGE E. SPEAR, OF AMESBURY, MASSACHUSETTS, ASSIGNOR TO STANDARD THERMOMETER COMPANY, OF BOSTON, MASSACHUSETTS, A CORPORATION OF MAINE.

THERMOSTATIC CIRCUIT-CONTROLLER.

1,112,391.  Specification of Letters Patent.  Patented Sept. 29, 1914.

Application filed April 11, 1913. Serial No. 760,564.

*To all whom it may concern:*

Be it known that I, GEORGE E. SPEAR, a citizen of the United States, residing in Amesbury, in the county of Essex and State of Massachusetts, have invented an Improvement in Thermostatic Circuit-Controllers, of which the following description, in connection with the accompanying drawings, is a specification, like letters on the drawings representing like parts.

This invention relates to a thermostatic circuit controller especially adapted for giving an alarm when the temperature of the room or building rises to a predetermined point, and to give another alarm when the temperature falls to a predetermined point.

The instrument is especially adapted among other uses to be employed by florists in greenhouses, where it is desired to keep the temperature from rising and falling above and below predetermined points.

The invention has for its object to provide an efficient, inexpensive and reliable instrument for the purpose specified.

The particular features of the invention will be pointed out in the claim at the end of this specification.

Figure 1:
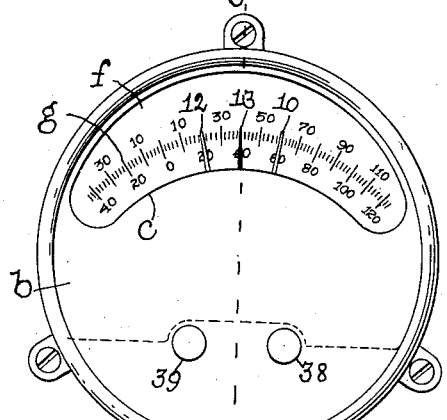
Figure 2:
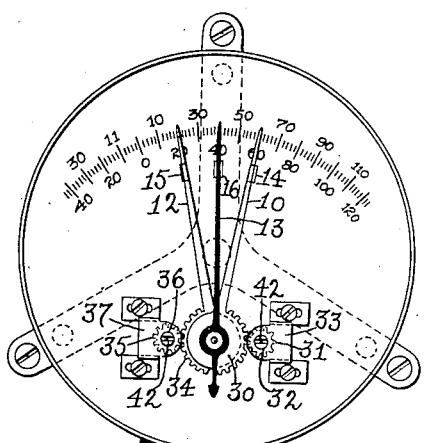
Figures 3, 4:
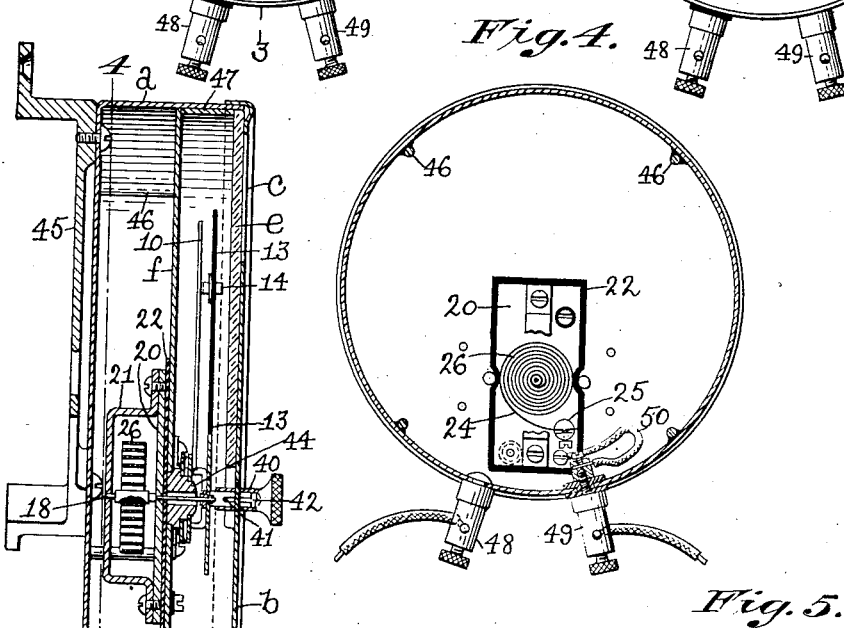
Figure 5:
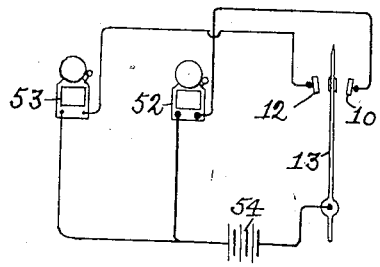

Figure 1 is a front elevation of an instrument embodying this invention. Fig. 2, an elevation with the cover removed. Fig. 3, a section on the line 3—3, Fig. 1. Fig. 4, a section on the line 4—4, Fig. 3, and Fig. 5, a diagram of circuits to be referred to.

Referring to the drawing $a$ represents a casing, containing the operative parts and provided with a removable cover $b$ having in it a slot $c$, which is covered by a glass disk $e$. The casing $a$ contains a disk $f$ provided with graduations $g$ indicative of degrees of temperature and with which coöperate three pointers or movable hands 10, 12, 13, for a purpose as will be described. The pointers or hands 10, 12, are designed to be moved by hand to register with the high and low temperatures between which it is desired to keep the greenhouse or other building or a room therein, and when once positioned become stationary until they are moved by the operator. The pointers 10, 12 are preferably made of metal and have extended from them arms 14, 15, which form contact points or terminals with which a contact point 16 on the center pointer 13 is adapted to be engaged by movement of the pointer 13 in response to temperature changes.

The pointer 13 forms a movable contact arm and is affixed to a shaft 18 extended through a hole in the disk $f$ and supported by a plate 20 secured to the rear face of said disk and by a cross bar 21 secured to said plate. The plate 20 is electrically separated from the disk $f$ by a sheet 22 of mica or other suitable insulation. The shaft 18 is turned by a thermostatic strip 24 having one end fastened to a stud or post 25 secured to the plate 20 and provided with a plurality of convolutions 26, which are concentric with the shaft 18 and secured thereto in any suitable manner.

The pointer 10 is soldered or otherwise secured to a toothed disk 30, see Fig. 2, which meshes with a pinion 31 on a shaft 32 supported by the disk $f$ and by a cross bar 33 fastened to said disk, and the pointer 12 is secured to a separate toothed disk 34 which meshes with a pinion 35 on a shaft 36, supported by the disk $f$ and a cross bar 37 secured to said disk.

The shafts 32, 36 are designed to be turned by means of handles 38, 39 detachable from them and extended through suitable holes in the cover $b$. Each handle may be provided with a hollow stem or shank 40, see Fig. 3, having a cross pin 41 which enters a longitudinal slot 42 in the free end of the shaft with which the handle coöperates. The handle is made detachable to prevent the pointers being moved by unauthorized persons. The toothed disks 30, 34 are concentrically mounted on a hub 44 attached to the plate 20 and extended through the disk $f$, and said toothed disks have their toothed portions of larger diameter than the plain portions of their circumferences, see Fig. 2. The casing $a$ is secured as herein shown to a spider or frame 45. The disk $f$ is positioned within the casing $a$ by studs or posts 46 and a ring 47.

The casing $a$ carries two binding posts 48, 49, one of which as 48 is electrically connected with the casing $a$, and the other of which is insulated from the said casing and is connected by wire 50 with the plate 20, which as above described is insulated from the casing. The binding post 48 is thus electrically connected with the practically stationary pointers or arms 10, 12, and the binding post 49 with the movable pointer 13.

In operation, the florist or other operator turns the pointer 10 until it registers with the graduation indicative of the high temperature point represented in Fig. 2 as 65°, and he also turns the pointer 12 to the low temperature point represented as 20°. The temperature of the greenhouse or other room can vary between these points without doing any harm, but if it should exceed the high point or fall below the low point, the florist desires to know this fact, which is accomplished by providing two alarms, which are represented in Fig. 6 as two electric bells, 52, 53, which have different or distinguishing sounds. One bell as 52 is connected in circuit with the terminal pointer 10 and the other bell 53 with the terminal pointer 12, and both bells are connected in circuit with one pole of the battery 54, with the other pole of which the movable pointer 13 is connected. It will thus be seen, that when the temperature reaches 65°, the movable pointer 13 engages the contact 14 on the pointer 10 and closes the circuit of the bell 52, thus giving the alarm that the high temperature point has been reached. When the temperature falls to 20°, the movable pointer 12 engages the contact 15 on the pointer 12 and closes the circuit of the bell 53, thus giving the alarm that the low temperature point has been reached. The florist is thus enabled to safeguard his property. The instrument is capable of being used in any place where it is desired to serve notice that the temperature has risen or fallen to a danger point.

Claim—

In an instrument of the class described, in combination, a plurality of pointers, independently rotatable disks to which said pointers are secured, said disks being concentrically mounted with the toothed portions of their circumferences arranged opposite each other and of larger diameter than the untoothed portions of said circumferences, pinions in mesh with said toothed portions, and shafts on which said pinions are mounted.

In testimony whereof, I have signed my name to this specification in the presence of two subscribing witnesses.

GEORGE E. SPEAR.

Witnesses:
E. M. REED,
FRED L. HAGAR.